United States Patent

[11] 3,607,181

[72] Inventor Eizo Goto
 Chigasaki-shi, Japan
[21] Appl. No. 786,656
[22] Filed Dec. 24, 1968
[45] Patented Sept. 21, 1971
[73] Assignee Tokyo Shibaura Electric Co., Ltd.
 Kawasaki-shi, Japan
[32] Priority Dec. 25, 1967, Jan. 10, 1968, Feb. 19, 1968
[33] Japan
[31] 42/82695, 43/1020 and 43/10074

[54] GLASS BRAZING METHOD
 5 Claims, 17 Drawing Figs.
[52] U.S. Cl. ...................................... 65/40, 65/43, 65/59
[51] Int. Cl. ....................................... C03c 27/00
[50] Field of Search ........................... 65/60, 59, 43, 40, 36; 29/472.9

[56] References Cited
 UNITED STATES PATENTS
 2,527,720 10/1950 Guyer ........................... 65/43 X
 3,120,433 2/1964 Van Zee ........................ 65/43
 3,211,541 10/1965 Leonard ........................ 65/60 X
Primary Examiner—S. Leon Bashore
Assistant Examiner—Saul R. Friedman
Attorney—Kemon, Palmer & Estabrook ABSTRACT: A glass brazing method for sealing a seal portion of a workpiece wherein the brazing glass is applied to the tip of a soldering iron by the step of dipping the tip of the iron heated to a first temperature, into a bath of molten glass so that some of the glass adheres to the tip. The tip is then positioned above the seal portion and is heated to a temperature higher than the first temperature so that the glass on the tip melts and pours down onto the seal portion to close it. In another embodiment the brazing glass adhering to the tip is brought into contact with the seal portion and an electric current is conducted through the brazing glass across the seal portion and the tip to thus melt the glass to pour it down onto the seal portion.

PATENTED SEP 21 1971 3,607,181
SHEET 1 OF 2
FIG.1A FIG.1C FIG.1E
FIG.1B FIG.1D
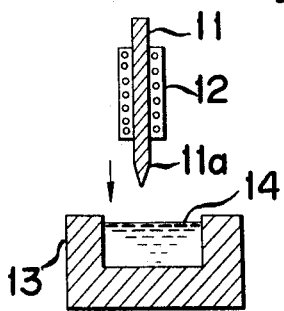
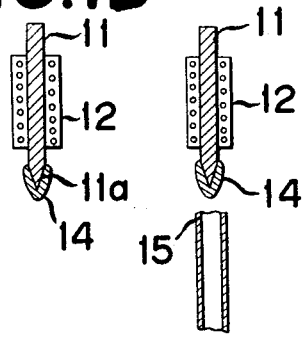
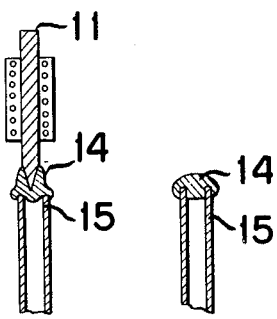
FIG.2 FIG.3
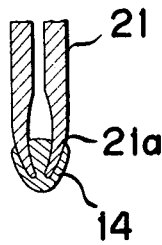
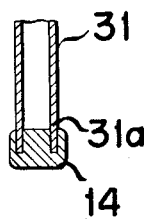
FIG.4A FIG.4B
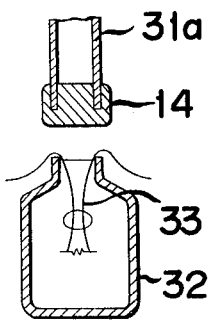
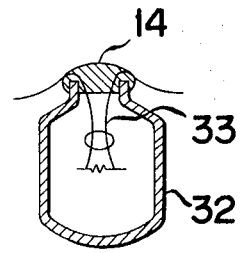
INVENTOR.
Eizo Goto
BY
Kenmore, Palmer & Estabrook PATENTED SEP 21 1971
3,607,181
SHEET 2 OF 2
FIG.5
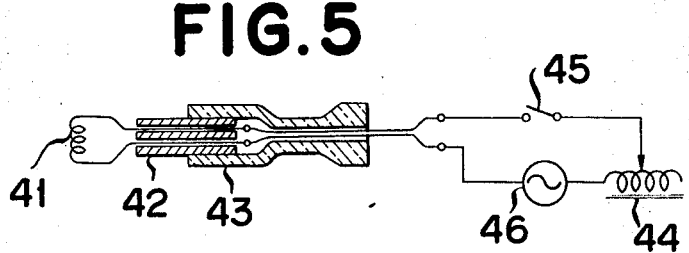
FIG.6A  FIG.6C
FIG.6B  FIG.6D
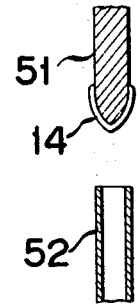 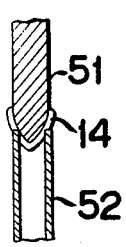 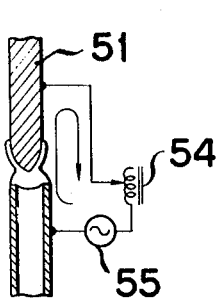 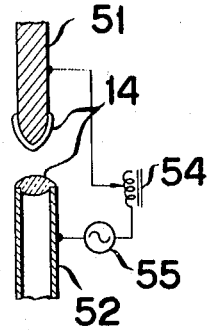
FIG.7A  FIG.7B  FIG.7C
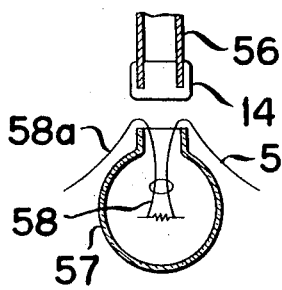 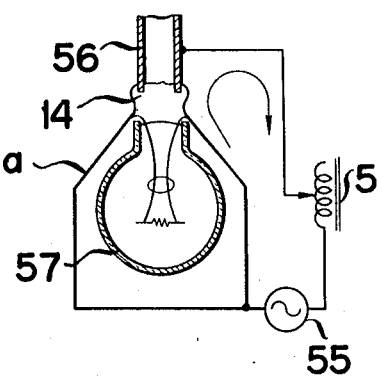 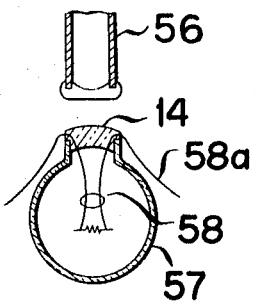
INVENTOR.
BY Eizo Goto
Kenway, Palmer & Estabrook

GLASS BRAZING METHOD

The present invention relates to a glass brazing method which consists in supporting brazing glass on a soldering iron and pouring the glass to a work material.

This type of glass brazing is used in sealing electric bulbs and electron tubes and other fields of applications.

Exemplary of the method of sealing articles made of glass metal or ceramic material with low melting glass is the sealing of the face plate of a Braun tube which comprises spreading powders of low melting glass over the joint surface and heating the mass in a furnace for fusion. However, the sealing of small tubes and bulbs by such process was accompanied with the drawbacks that the sealing operation was undesirably complicated, often leading to incomplete sealing.

The present invention has been developed and is intended to provide a suitable glass brazing method which comprises preheating a soldering iron to a sufficient temperature to allow brazing glass to be easily attached thereto and fully raising the temperature of the soldering iron when the brazing glass deposited on the iron is made to contact a work material.

The present invention can be more fully understood from the following detailed description when taken in connection with the accompanying drawings, in which:

FIGS. 1A to 1E are schematic sectional view illustrating the sequential steps of the glass brazing method of the present invention;

FIGS. 2 and 3 are sectional views of the end parts of the soldering irons used in the method of the present invention;

FIGS. 4A and 4B are schematic sectional views of the glass brazing process using the soldering iron shown in FIG. 3;

FIG. 5 is a schematic sectional view of the soldering iron used in the method of the present invention;

FIGS. 6A to 6D jointly represent another embodiment of the present invention, indicating in section the process of sealing a pipe opening using brazing glass; and FIGS. 7A to 7C jointly indicate in section the glass brazing process according to still another embodiment of the present invention.

There will now be described the present invention by reference to the drawings as listed above. Referring first to FIG. 1, numeral 11 represents a soldering iron, the furthest end of which is formed into a conical shape. On the circumferential surface of the iron is mounted a heating means 12 prepared by winding an electric heating wire about said surface. The heating means is so designed as freely to control the temperature of the tip 11a of the soldering iron 11. First, the iron tip 11a is preheated to a temperature slightly lower than the melting point of the brazing glass 14 used so as to be readily wetted. The iron tip 11a is dipped in the low melting brazing glass already melted in a furnace 13 and quickly taken out of the bath. Thus the brazing glass 14 is deposited on the iron tip 11a as shown in FIG. 1B. The iron tip carrying the deposited brazing glass is brought near the seal portion 15 of a work material. When the temperature of the iron tip 11a is raised by the heating means 12 the brazing glass deposited thereon is again reduced in viscosity. Accordingly, when the iron tip 11a is gently pressed to the seal portion 15 as shown in FIG. 1D, the brazing glass runs down on said seal portion, and upon the removal of the iron tip 11a there can be effected sealing as illustrated in FIG. 1E. While the gentle pressing of the iron tip 11a to the seal portion 15 is effective in causing the low melting brazing glass 14 to flow down so as to close up the seal portion 15, it is also possible to drip instead the thermally melted brazing glass on to the seal portion 15 with the iron tip held in the position of FIG. 1C.

The iron tip preferably consists of a heat-resistant material such as an iron-nickel alloy, platinum or molybdenum. The iron tip may have various shapes suitable selected as occasion demands in addition to the conical form of FIG. 1A. For instance, the iron tip may have the form of a drawing pen as illustrated by the tip 21a of the iron 21 of FIG. 2, or a tubular form as shown by the tip 31a of the iron 31 of FIG. 3. Such shapes of the iron tip permit relatively large amounts of brazing glass to be deposited. Where the relatively broad opening of a bulb 32 as shown in FIG. 4A is to be sealed, the iron tip 31a carrying deposited low melting brazing glass 14 is positioned above the opening of the bulb 32 where a mount 33 is placed. Then the temperature of the iron tip 31a is elevated to liquefy and pour down the deposited brazing glass 14 so as to seal the mount 33 to the bulb 32 as illustrated in FIG. 4B. The amount of brazing glass deposited on the iron tip may be suitable varied by properly selecting the shape of the iron tip, the viscosity of brazing glass and the extent of dipping the iron tip. The sealing process of the present invention is carried out in the ambient atmosphere of seal gas, so that there is not required an exhaust pipe to evacuate the bulb 32 and the introduction of seal gas into the bulb and the sealing of the bulb opening can be carried out at one step.

With the soldering iron having the form as shown in FIGS. 1 to 3, the iron tip is indirectly heated and also has a relatively large heat capacity, so that it presents difficulties in allowing its temperature to be quickly controlled in a short time. Accordingly, where such instant temperature control is demanded, it is preferred that the iron tip be formed of a refractory heat element. In this case, the heat element is desired to have a small heat capacity. Namely, the iron tip 41 preferably consists of, for example, a metal wire heat element formed into a coil having a suitable diameter and pitch as shown in FIG. 5. The iron tip 41 has its base supported by a heat-insulating tube 42 and on the outside of said tube 42 is fitted a handle 43. Further, the iron tip is connected to a power source 46 through a current-regulating means, for example, an adjustable stabilizer 44 and a switch 45.

Where glass brazing is performed with a soldering iron of the aforementioned arrangement the switch 45 is first closed and the stabilizer 44 is so adjusted as to cause the iron tip 41 to be preheated to such extent that low melting brazing glass can be readily deposited thereon. This preheating temperature ranges approximately between 700° and 800° C., in case the low melting brazing glass used has a softening point of 480° C. After preheating, the iron tip 41 is dipped into a bath of low melting glass, causing said glass to be deposited thereon upon its removal. The iron tip now carrying the deposited glass is gently pressed to the seal portion of a work material and heated to a temperature of about 1,000° C. by again adjusting the stabilizer 44. Then the deposited brazing glass reduces in viscosity again, easily detaches itself from the iron tip 41 and flows down on the seal portion of the work material. Such direct heating of the iron tip permits its heat capacity to be reduced and its temperature to be controlled to a desired level in a short time, thus enabling glass brazing to be effected quickly.

Glass begins to display electric conductivity as its temperature rises and is further heated by the Joule's heat generated by the electric current running through the glass itself. However, the current in the glass can be controlled by a current regulator. The iron tip consists of a refractory heat element such as nickel, carbon, molybdenum or tungsten. It may assume any desired form such as a plate or cylinder in addition to the aforesaid coil.

Where a work material consists of metals having good thermal conductively, there is a likelihood that the application of heat merely from the iron tip fails to raise the temperature of a work material to a sufficient extent. In such case, it is preferred to use a soldering iron of good conductivity, deposit brazing glass on its tip after preheating, contact the deposited brazing glass with the seal portion of a work material, and introduce electric current through the brazing glass across the work material and soldering iron, thereby to carry out glass brazing by melting the deposited glass with the Joule's heat occurring in said glass. This process allows the heating section to be confined to a narrow area and the deformation of the seal portion of a work material to be reduced, so that the work material as a whole can retain a great mechanical strength after sealing. The process has further advantages that the time of sealing is shortened and there is eliminated the trouble of particularly controlling the temperature of a soldering iron.

FIGS. 6A to 6D illustrate the aforementioned glass brazing process. The description will now be taken by reference to the case where the open end of a tube 52 made of an iron-nickel alloy 4 mm. in outer diameter and 0.1 mm. thick is sealed with brazing glass. The soldering iron 51 consists of a molybdenum rod 4 mm. in outer diameter, the end portion of which assumes a substantially conical form. On the iron tip preheated to 600° to b 700° C. is deposited brazing glass 14 consisting of low melting glass having a softening point of 450° C. and a thermal expansion coefficient of $88 \times 10^{17}/°$ C. substantially equal to that of the metal tube 52. The iron tip carrying the deposited glass is spatially disposed from the open end of the metal tube in opposite relationship to said open end as shown in FIG. 6A. Then the deposited brazing glass 14 is made to contact the open end of the metal tube 52 as illustrated in FIG. 6B. Thereafter there is impressed as shown in FIG. 6C a voltage of 10 v. from an AC source 55 through a variable-impedance-type stabilizer 54 across the soldering iron 51 and metal tube 52. These iron 51 and tube 52 are bridged by the brazing glass 14 preheated to 600° to 700° C. so as to permit the easy introduction of electric current, so that the brazing glass 14 is rapidly raised in temperature due to the Joule's heat generated by the impression of the aforementioned voltage, the viscosity of said glass being reduced to around several poises in an extremely short time, for example, in a fraction of a second. Accordingly, the brazing glass 14 is easily separated from the tip of the soldering iron 51, causing the open end of the metal tube 52 to be firmly sealed by the fusion of said glass 14.

Also in this case, there is no particular limitation on the form and structure of the soldering iron. They may be suitably selected in accordance with the form and structure of a work material and other glass brazing conditions. Further, it is not always required that the seal portion of a work material be entirely formed of metal. It will be sufficient if at least part of said portion is made of conductive material. Glass brazing can be easily carried out, provided due consideration is given to the viscosity of brazing glass prior to the impression of voltage and the temperature to which a work material is to be preheated. For instance, a soldering iron 56 whose tip assumes the form as shown in FIG. 3 enables the open end of a glass bulb 57 as illustrated in FIG. 7A to be sealed, with a bead mount 58 housed therein and a lead wire 58a conducted to the outside. In this case, as indicated in FIG. 7B, there is supplied electric current from a source 55 through a stabilizer 54 across the drawn-out lead wire 58a and soldering iron 56 to cause the opening of the glass bulb 57 to be sealed as shown in FIG. 7C. It is preferred that the soldering iron 56 be of substantially the same diameter as the open end of the bulb 57. If, in this case, glass brazing is performed in the ambient atmosphere of seal gas such as argon or nitrogen as in FIG. 4, the evacuation and sealing of the bulb 57 can be effected at once.

The aforementioned introduction of electric current through the deposited brazing glass 14 enables the lead wire 58a to be unfailingly wetted by said glass, eliminating the occurrence of gas leaks. Since the elevated temperature of the brazing glass results in the rapid decrease of resistance and consequently the sharp increase of electric current, it is desired to employ a stabilizer 54 or other constant current apparatuses. The kind of brazing glass used in the method of the present invention is not subject to any particular restriction. It is only required to select the brazing glass whose thermal expansion coefficient equals or approximates that of a work material or determine the kind of glass in consideration of other brazing conditions involved.

As mentioned above, the present invention enables an article made of glass, metal, ceramic material, etc. to be easily sealed by a simple glass brazing process.

What is claimed is:

1. A glass brazing method for sealing a seal portion of a workpiece having a seal portion with a glass seal which comprises applying a quantity of brazing glass to the tip of a soldering iron heated to a first temperature, positioning the glass-carrying soldering iron tip above said seal portion, heating the glass on said tip to a second temperature higher than said first temperature to melt and pour down at least part of said glass quantity on said seal portion of the workpiece, and withdrawing said tip away from said seal portion leaving at least part of said brazing glass closing said seal portion.

2. A glass brazing method for sealing a seal portion of a metal workpiece having a seal portion with a glass seal which comprises dipping the tip of a soldering iron heated to a first temperature in a bath of molten glass to cause a quantity of the molten glass to be deposited on said tip, withdrawing said tip from said bath with said quantity of molten glass thereon, positioning the glass-carrying soldering iron tip above said seal portion, heating the glass on said tip to a second temperature higher than said first temperature to further melt it and pour down at least a part of it on said seal portion of the workpiece and withdrawing said tip away from said seal portion leaving at least part of said quantity of glass closing said seal portion.

3. A glass brazing method according to claim 2 wherein the step of heating the brazing glass deposited on the iron tip to be poured on the seal portion of the work material is carried out by contacting the brazing glass deposited on the iron tip with the seal portion of the work material and thereafter conducting electric current through the brazing glass across the seal portion of the work material and iron tip.

4. A glass brazing method according to claim 1 wherein the temperature of the iron tip is indirectly controlled by a heater positioned adjacent to the iron tip.

5. A glass brazing method according to claim 1 wherein the iron tip consists of a refractory heating element so as to permit the direct control of its temperature.